United States Patent [19]

Park et al.

[11] Patent Number: 5,815,910

[45] Date of Patent: Oct. 6, 1998

[54] METHOD FOR MANUFACTURING A MAGNETIC HEAD

[75] Inventors: Young-soo Park, Kyungki-Do; Sang-joon Kim, Suwon; Sung-hoon Kim, Seoul; Jo-won Lee, Suwon, all of Rep. of Korea

[73] Assignee: Samsung Electronics Co., Ltd., Suwon, Rep. of Korea

[21] Appl. No.: 502,398

[22] Filed: Jul. 14, 1995

[30] Foreign Application Priority Data

| Jul. 13, 1994 | [KR] | Rep. of Korea | 94-16779 |
| Sep. 28, 1994 | [KR] | Rep. of Korea | 94-24559 |
| Mar. 27, 1995 | [KR] | Rep. of Korea | 95-6546 |

[51] Int. Cl.$^6$ ............ G11B 5/127; G11B 5/40; G11B 5/72

[52] U.S. Cl. ............ 29/603.16; 29/603.2; 29/603.21; 216/22; 360/122; 427/131

[58] Field of Search ............ 29/603.12, 603.13–603.16, 29/603.07, 603.2, 603.21; 360/122, 103; 428/694 MT, 694 TF, 694 TC; 427/132, 576, 577, 130, 131; 216/22

[56] References Cited

U.S. PATENT DOCUMENTS

| 3,516,153 | 6/1970 | Schneider | 29/603.2 X |
| 3,566,045 | 2/1971 | Paine et al. | 29/603.13 |
| 4,228,142 | 10/1980 | Holcombe, Jr. et al. | |
| 4,503,125 | 3/1985 | Nelson et al. | 427/132 X |
| 4,589,043 | 5/1986 | Grundtner | 29/603.2 X |
| 4,670,972 | 6/1987 | Sakakima | 29/603.2 X |
| 4,939,835 | 7/1990 | Coutellier et al. | 29/603.2 X |
| 4,943,882 | 7/1990 | Wada et al. | 29/603.14 X |
| 4,947,541 | 8/1990 | Toyoda et al. | 29/603.16 X |
| 5,023,738 | 6/1991 | Prenosil | 360/122 |
| 5,110,676 | 5/1992 | Murai et al. | 428/695 |
| 5,159,508 | 10/1992 | Grill et al. | 29/603.12 |
| 5,182,132 | 1/1993 | Murai et al. | 427/131 |
| 5,425,988 | 6/1995 | Ogawa et al. | 360/122 X |
| 5,453,168 | 9/1995 | Nelson et al. | 427/132 X |
| 5,462,784 | 10/1995 | Grill et al. | 427/131 X |
| 5,500,296 | 3/1996 | Inoue et al. | 429/694 TF X |
| 5,636,092 | 6/1997 | Nasu et al. | 360/122 |

FOREIGN PATENT DOCUMENTS

| 143411 | 7/1985 | Japan | 360/122 |
| 222313 | 9/1988 | Japan | 360/122 |

*Primary Examiner*—Peter Vo
*Attorney, Agent, or Firm*—Burns, Doane, Swecker & Mathis, L.L.P.

[57] ABSTRACT

A method for manufacturing a magnetic head recording and reproducing information on or from magnetic recording media such as a video tape, includes the steps of preparing a chip core having a contact surface with which a magnetic tape contacts and on which a gap for forming a leakage magnetic field is formed, polishing the contact surface of the chip core by using an ion etching method where the contact surface is bombarded with ions, and forming a protection layer on the contact surface, which is made of a material having high surface lubrication properties and good anti-abrasion properties. In the above method, the contamination of the head is reduced, the life span of the head is prolonged and the magnetic recording and reproducing characteristics are improved.

56 Claims, 15 Drawing Sheets

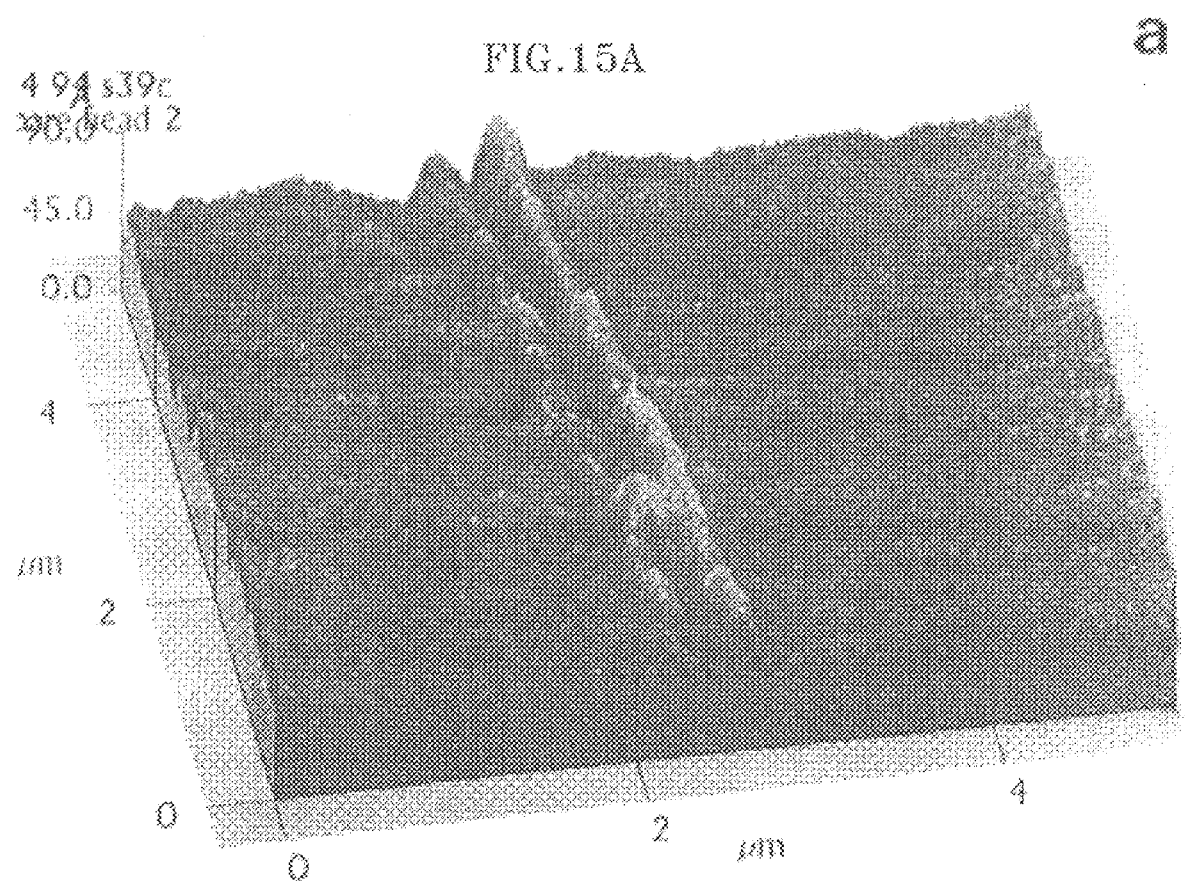

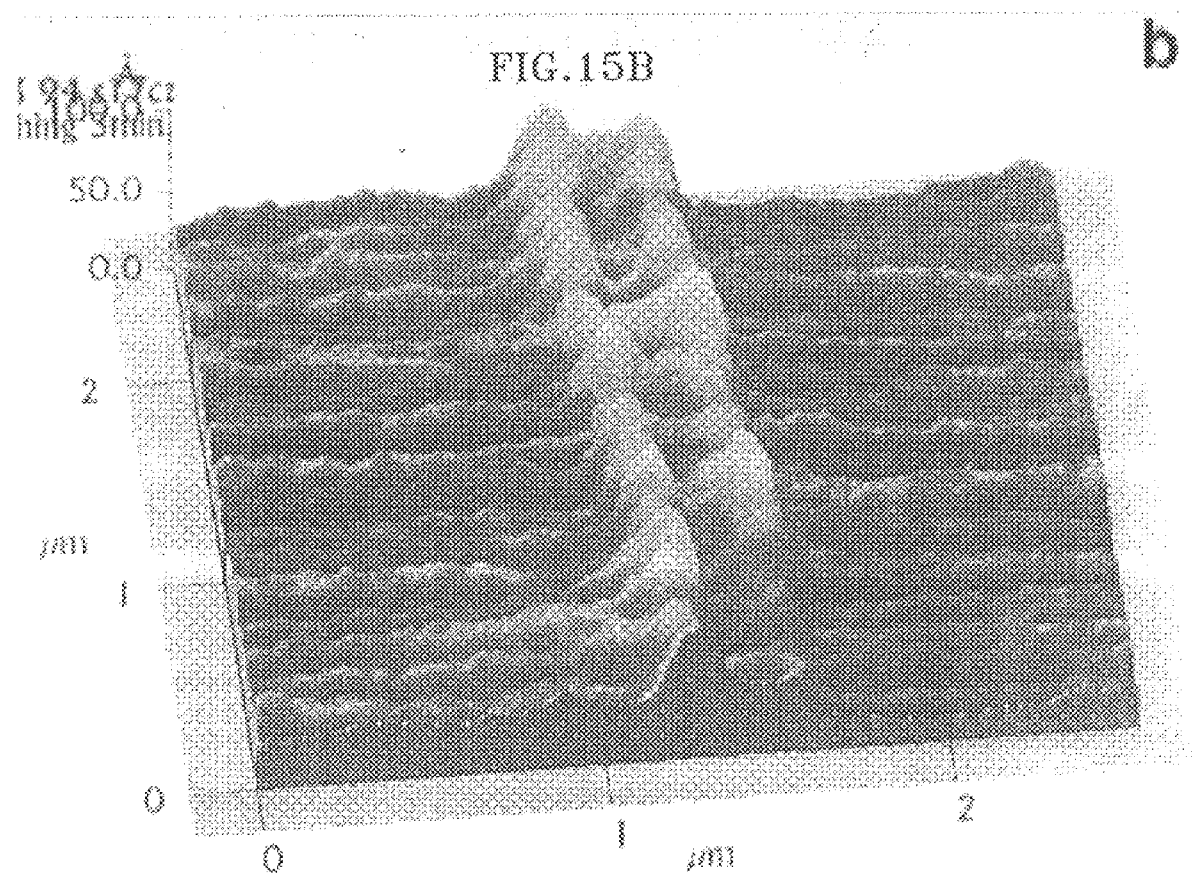

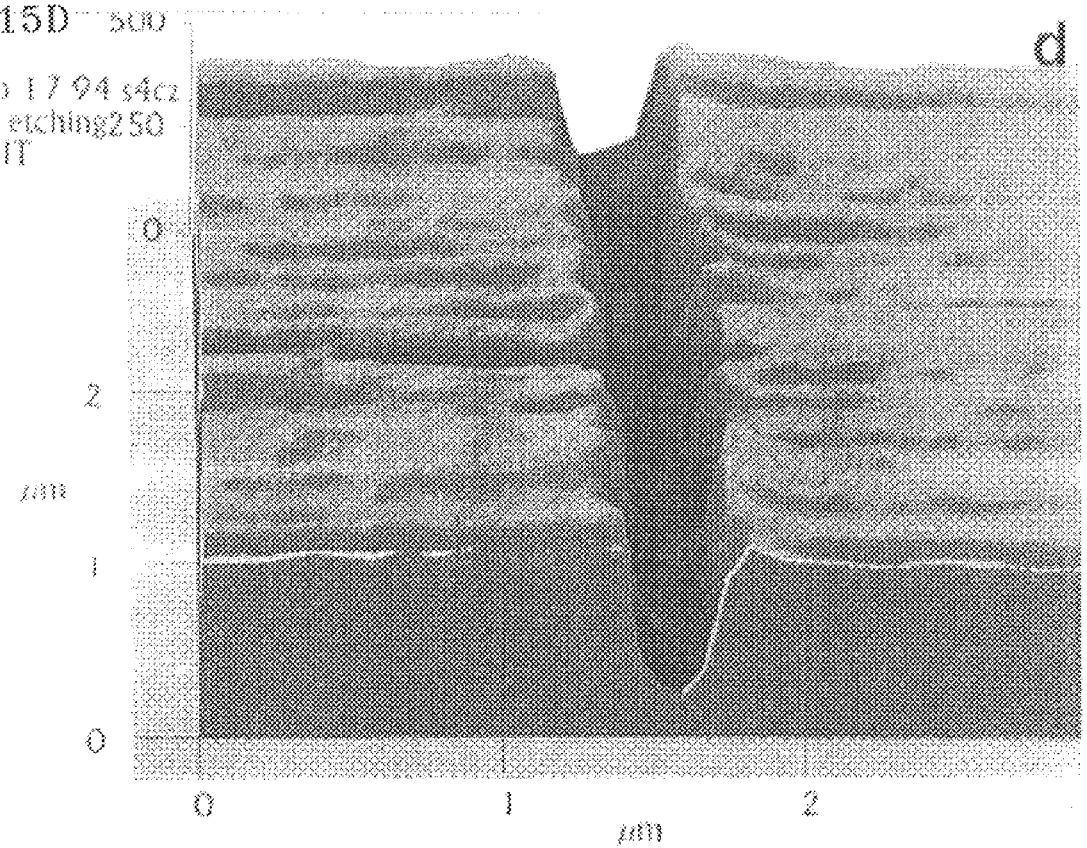

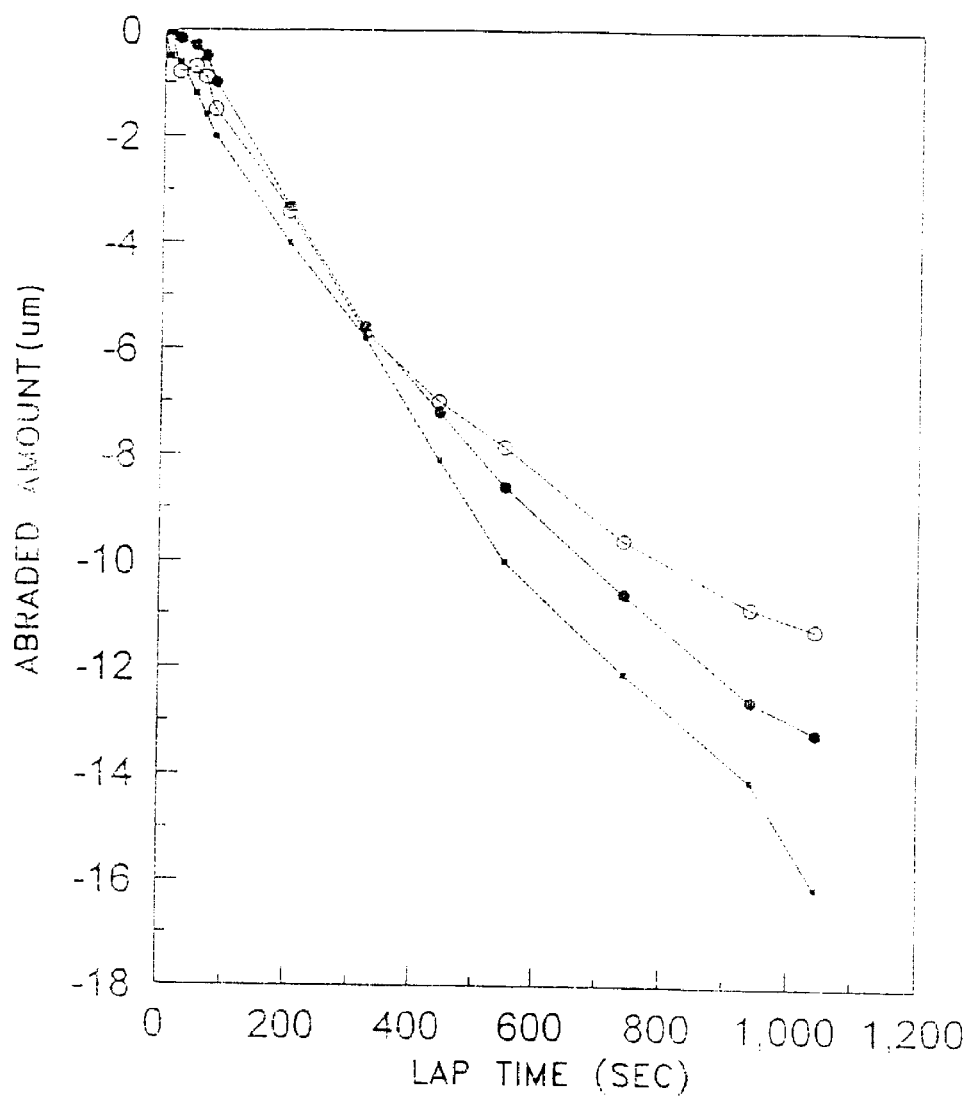

METHOD FOR MANUFACTURING A MAGNETIC HEAD

BACKGROUND OF THE INVENTION

The present invention relates to a magnetic head which is installed in a rotary head drum for recording and reproducing information on and from magnetic recording media such as video tape, and more particularly, to a method for manufacturing a magnetic head in which a protection layer with high lubricating and anti-abrasion properties is formed on the surface which comes into contact with the magnetic tape.

Generally, magnetic recording and reproduction are performed through friction between a magnetic head and magnetic tape. As shown in FIG. 1, video tape recorders (VTR), portable video cameras, digital audio tape recorders (DAT) have a rotary head drum 2 in which a magnetic head is installed. Head drum 2 generally rotates at high speed counterclockwise and a magnetic tape 3 which is in contact with the surface of head drum 2 in a U-shape proceeds at a lower speed from left to right in accordance with the rotation of rotary drum 2.

As a result of the process described above, foreign matter is generated by friction between magnetic tape 3 proceeding at low speed and magnetic head 1 of head drum 2 rotating at high speed. Here, the foreign matter is particles from magnetic tape 3 and magnetic head 2, which abrade magnetic tape 3, magnetic head 1 and head drum 2 to thereby shorten their respective life spans as well as generate noise during recording and reproduction.

FIG. 2 is a schematic perspective view of a conventional magnetic head 10 installed in a head drum for a VTR and FIG. 3 is a partial cross-section showing conventional magnetic head 10 shown in FIG. 2.

As shown in FIG. 2, magnetic head 10 comprises first and second core members 11 and 12 which are connected, and a coil 13 wound around middle portion of each core member. First and second core members 11 and 12 have a curved contact surface 14 which comes into contact with the magnetic tape. Also, there is a gap 15 of a predetermined length L in contact surface 14 of first and second core members, from which a leakage magnetic field is formed. A non-magnetic substance such as a silicon oxide ($SiO_2$) layer 17 is interposed in gap 15 and this adheres the first and second core members 11 and 12 to each other. A recess 16 of a partial spherical shape, for controlling the width of gap 15, is formed on both sides of gap 15, and is filled with reinforced glass 18.

First and second core members 11 and 12 are made of a ferromagnetic material such as ferrite or permalloy having high permeability, in which the loss of magnetic flux is less and the leakage magnetic field corresponding to a recording current can be generated.

In FIG. 3, it is preferable that depth D of gap 15 is 20 $\mu$m when considering magnetic characteristics. However, according to the conventional method, contact surface 14 was polished with a lapping tape (#20000) to make depth D 30–45 $\mu$m, giving a life span of about 1000 hours. FIG. 4 is a photograph taken by Atomic Force Micrography (AFM), which shows the contact surface of a magnetic head polished with a lapping tape.

The polished contact surface of the magnetic head looks macroscopically smooth, level and broad when seen with the naked eye. However, microscopically, it can be seen to be rough as shown in FIG. 4. This is a machine trace caused by the lapping tape. A protrusion is shown on both sides of gap 15 arranged along the longitudinal lapping direction of gap 15. Where the contact surface is rough and there are abnormal protrusions, foreign matter generated due to abrasion become attached, in particular, they are concentrated on the protrusions on both sides of gap 15, thereby severely reducing recording and reproducing characteristics.

Since the gap of a conventional magnetic head has a large cross-sectional area and the contact surface is broad and level, the density of magnetic flux leakage from the gap is low, thereby increasing frictional noise. That is, as the abrasion of the contact surface increases, the cross-sectional area of the gap, i.e., the magnetic flux pathway, gradually narrows, so that the gap resistance increases. As a result, the intensity of the magnetic flux leakage abnormally increases, thereby reducing the recording and reproducing characteristics.

Difference in physical properties among the core components, i.e., ferrite, silicon oxide and glass, exacerbate the contact surface, increasing both damage to the tape and hence foreign matter contamination of the magnetic head by material from the tape.

SUMMARY OF THE INVENTION

It is an object of the present invention to provide a method for manufacturing a magnetic head by which the levelness and broadness of the contact surface of the magnetic head can be improved so that foreign matter generated by friction between a magnetic tape and the magnetic head can be reduced and the accumulation of foreign matter on the contact surface of the magnetic head can be restricted.

It is another object of the present invention to provide a method for manufacturing a magnetic head by which the abrasion caused by friction between the magnetic head and magnetic tape can be minimized, so that the life span of the magnetic tape and magnetic head can be increased.

It is still another object of the present invention to provide a method for manufacturing a magnetic head by which the recording and reproducing characteristic of the magnetic head can be improved.

To achieve the above objects, there is provided a method for manufacturing a magnetic head comprising the steps of: preparing a chip core having a contact surface with which a magnetic tape contacts and on which a gap for forming a leakage magnetic field is formed; and forming a protection layer on the contact surface, which is made of material having high surface lubricating properties and good anti-abrasion properties.

To achieve the above objects, there is provided a method for manufacturing a magnetic head comprising the steps of: preparing a chip core having a contact surface with which a magnetic tape contacts and on which a gap for forming a leakage magnetic field is formed; polishing the contact surface of the chip core by using an ion etching method where the contact surface is bombarded with ions; and forming a protection layer on the contact surface, which is made of a material having high surface lubrication properties and good anti-abrasion properties.

In the polishing step, for the polishing efficiency, the ions collide with the contact surface of the chip core at a predetermined angle with respect to the contact surface. Particularly, it is preferable that the incident angle is 70° or less with respect to the contact surface.

BRIEF DESCRIPTION OF THE DRAWINGS

The above objects and advantages of the present invention will become more apparent by describing in detail preferred embodiments thereof with reference to the attached drawings in which:

FIGS. 15A to 15D are results of electron micrographs, which show a dry etching method for polishing the contact surface of the chip core according to the present invention;

FIG. 17 is a graph of lapping time versus degree of abrasion for showing anti-abrasion properties of heads having a DLC protection layer and a conventional head.

DETAILED DESCRIPTION OF THE INVENTION

Figure 1:
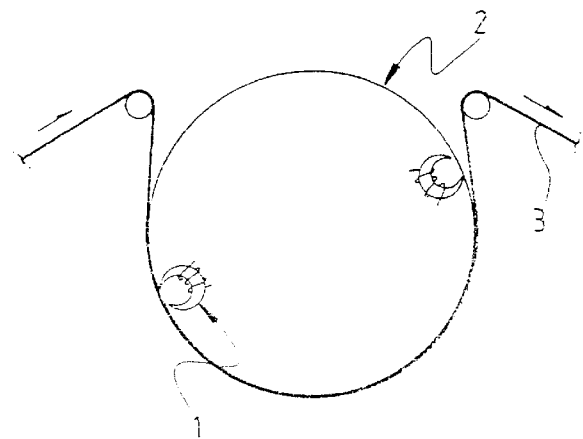
FIG. 1 is a schematic diagram showing the general relation between a rotary head drum, a magnetic head and a tape.
Figure 2:
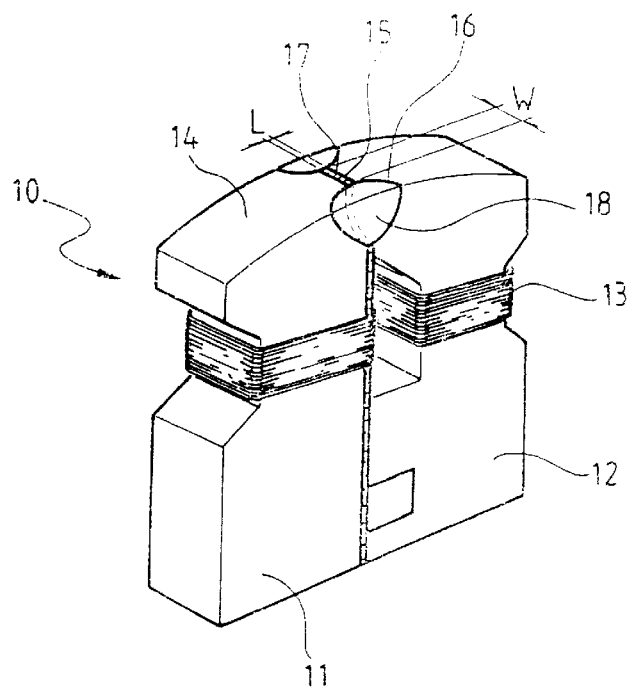
FIG. 2 is a perspective view schematically showing a conventional magnetic head.
Figure 3:
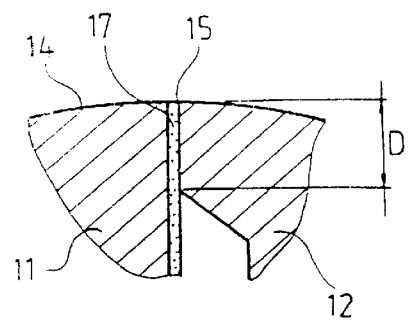
FIG. 3 is a cross-sectional view showing a gap portion of the conventional magnetic head shown in FIG. 2.
Figure 4:
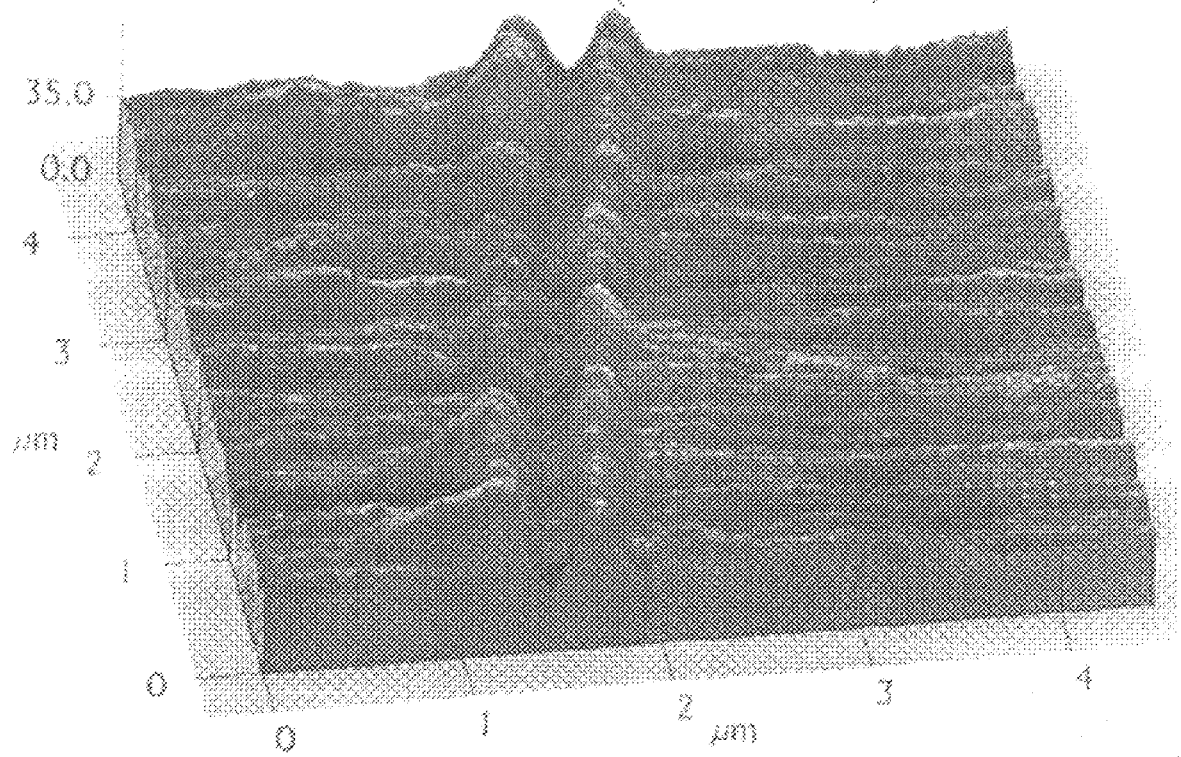
FIG. 4 is a photograph taken by Atomic Force Micrography (AFM), showing the contact surface of a conventional magnetic head polished with a lapping tape.
Figure 5:
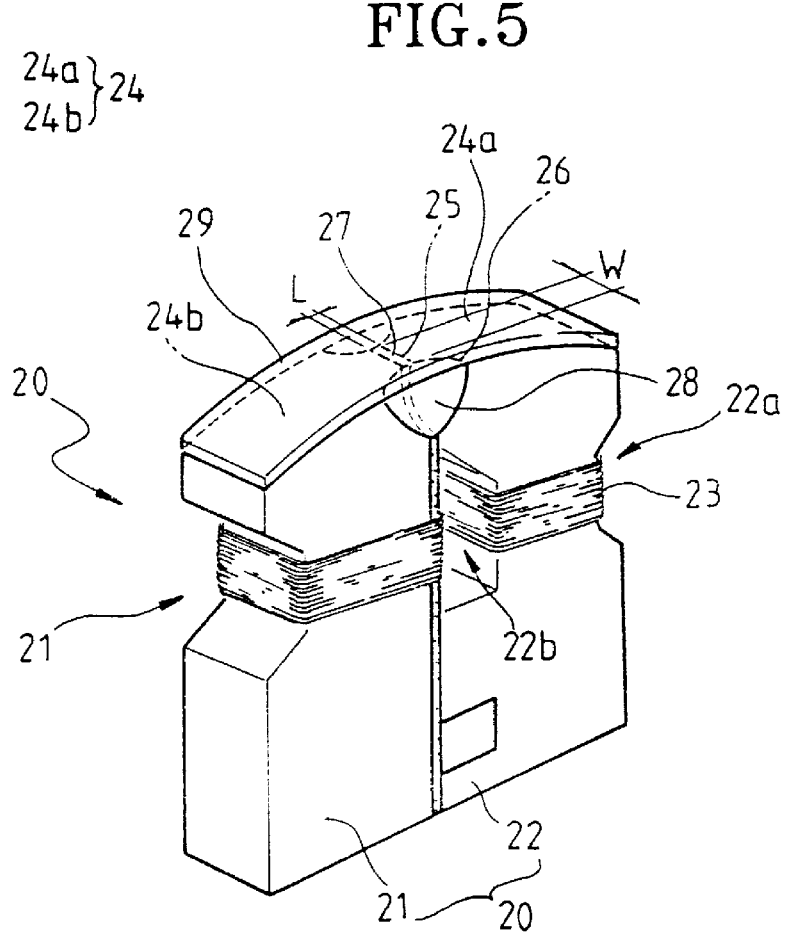
FIG. 5 is a perspective view of a magnetic head according to the present invention.
Figure 6:
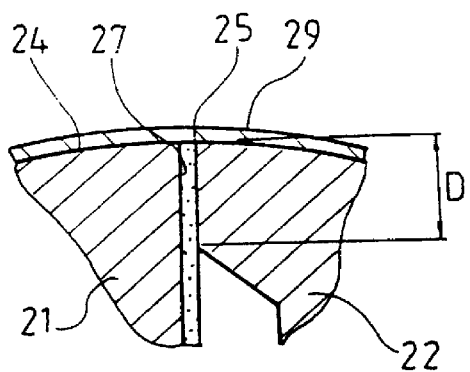
FIG. 6 is a cross-section showing the gap portion of the magnetic head shown in FIG. 5.

Referring to FIGS. 5 and 6, a magnetic head according to the present invention comprises a chip core 20 having parallel first and second core members 21 and 22 connected to each other by a silicon oxide layer 27 which is a non-magnetic adhesive. Winding grooves 21a, 22a and 22b around which coils 23 are wound are placed on the middle of first and second core members 21 and 22. Specifically, second core member 22 has two winding grooves 22a and 22b placed on the middle of two surfaces thereof. Thus, the upper and lower portions of first and second core members 21 and 22 are connected to each other. A gap of a predetermined length L for forming a leakage magnetic field for magnetic recording and reproduction is placed on the upper connected portion having a depth D which is filled with silicon oxide layer 27. Also, a recess 26 of a partial spherical shape for controlling width W of gap 25 is formed on both sides of gap 25, and is filled with a nonmagnetic reinforced glass 28.

Contact surface 24 of first and second core members 21 and 22 maintain a continuous smooth curve which is bisected by gap 25 filled with silicon oxide layer 27 into two contact surfaces 24a and 24b. A protection layer 29 having high lubricating and anti-abrasion properties is formed on the contact surfaces and silicon oxide layer 27 between them.

Here, width W of gap 25 is 19–90 $\mu$m, length L is 0.3–0.5 $\mu$m and depth D is 20–50 $\mu$m. The thickness of protection layer 29 ranges from 50 Å to 10 $\mu$m, preferably at 100 Å to 500 Å.

For the material of protection layer 29, one may be selected from the group consisting of amorphous diamond-like carbon (DLC) structure including: YSZ, W, CN, $Si_3N_4$, $MOS_2$, TiC and TiN. For forming protection layer 29, a synthesizing method using RF plasma, a DC sputtering method, a high frequency or ion beam sputtering method, a ion deposition or electron cyclotron,. resonance (ECR) method can be adopted. In the present experiment, the ECR method was used.

Figure 7:
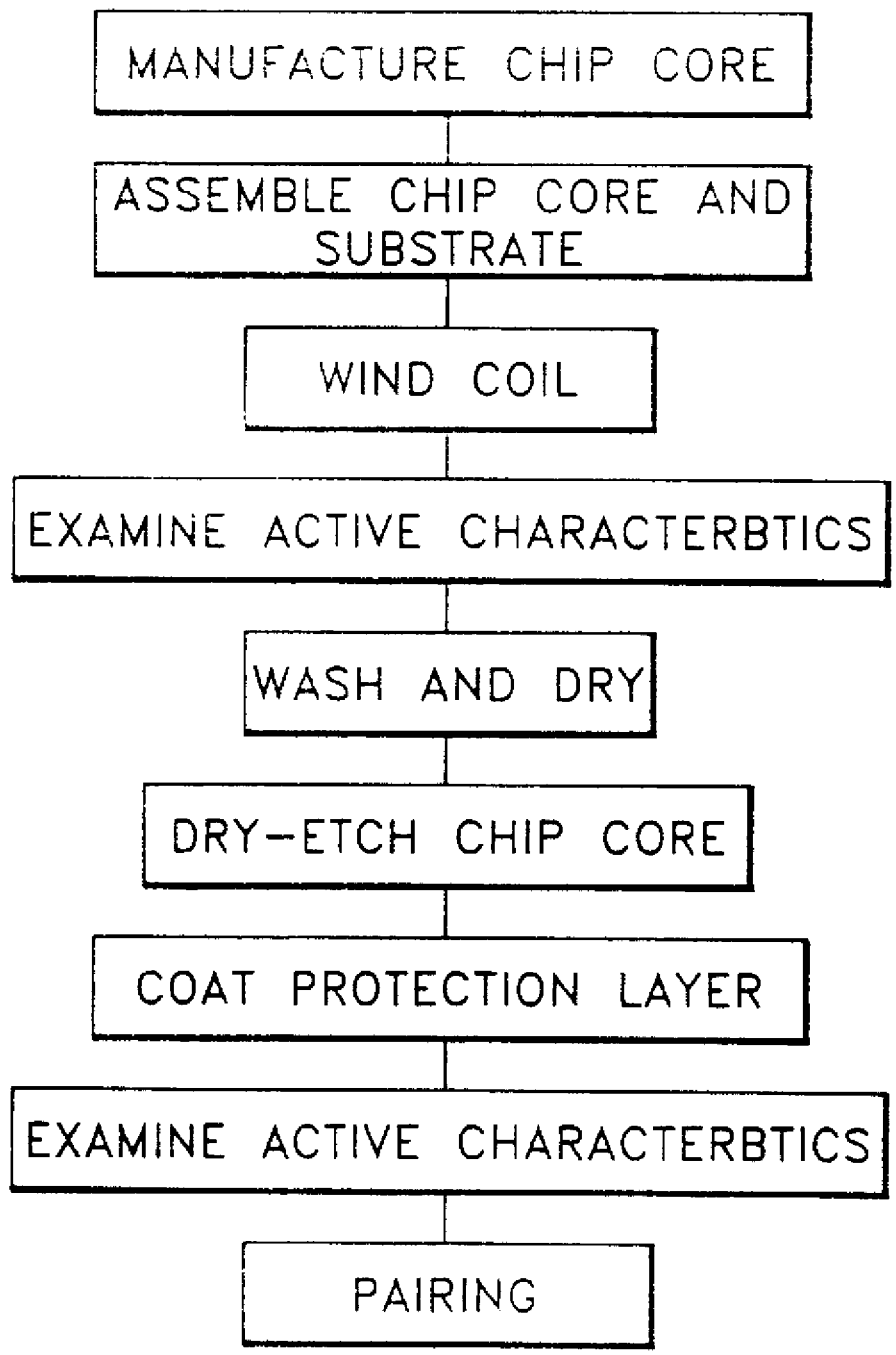
FIG. 7 is a flowchart illustrating a method for manufacturing magnetic head according to the present invention.

FIG. 7 is a flowchart illustrating a method for manufacturing the magnetic head according to the present invention. The preferred embodiment is not restricted to the steps and sequence shown in FIG. 7 and each step and sequence can be properly selected and controlled with the exception of specific cases.

Figure 8:
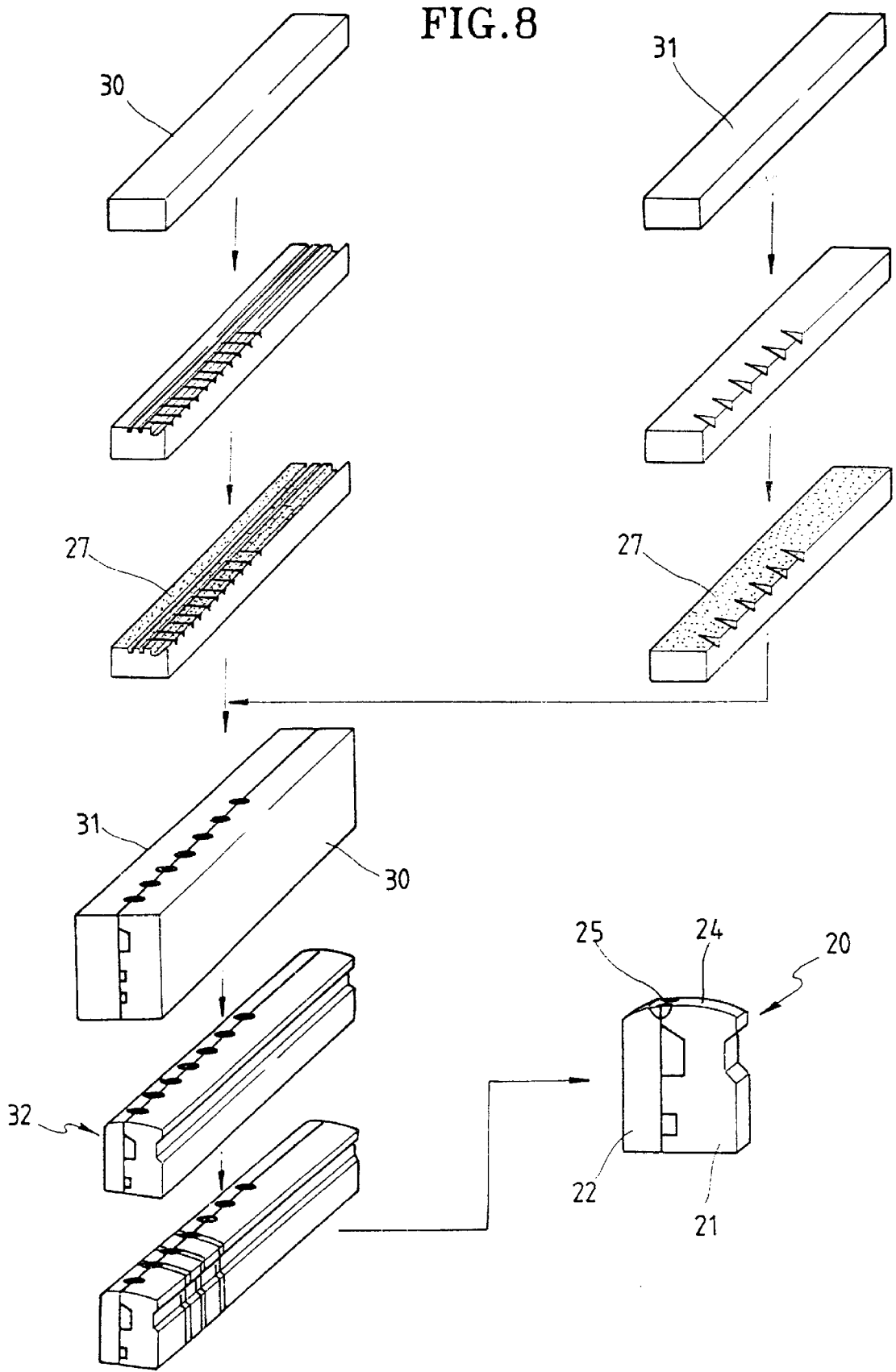
FIG. 8 is a diagram showing a procedure for processing a chip core for manufacturing the magnetic head.

FIG. 8 shows a procedure for processing a chip core.

Referring to FIG. 8, wound slots and track channels are formed on parent ferrite blocks 30 and 31 of core members 21 and 22 and each opposing surface thereof is smoothly polished. Silicon oxide layer 27 is sputtered onto the polished opposing surfaces and then two processed ferrite blocks 30 and 31 are connected to each other. Using a general method, the connected ferrite blocks 30 and 31 are processed by cross-section polishing, side and taper machining, bottom polishing, wound slot formation and finally contact surface processing, to thereby form a chip core block 32. Consequently, chip core block 32 is sliced at an angle at predetermined distances in accordance with a predetermined azimuth angle.

Figure 9:
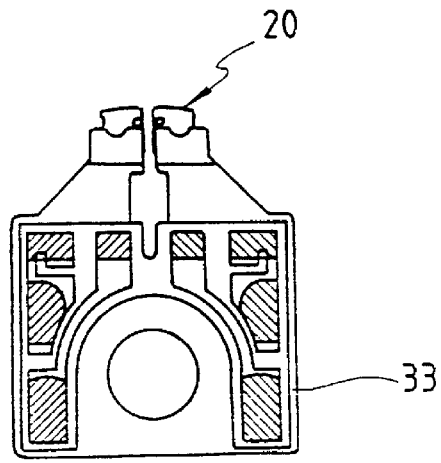
FIG. 9 is a plane view showing the chip core attached to a substrate.

In assembling the chip core and the substrate, chip core 20 is attached to the upper portion of a head base 33 using an UV bond as shown in FIG. 9. Contact surface 24 of the core members is processed into a curved shape in the predetermined direction of tape transfer and then coils are wound around each core member.

In the first examination step, the active characteristics of the magnetic head main body completed in the previous step are evaluated, to determine the quality thereof.

Figure 10:
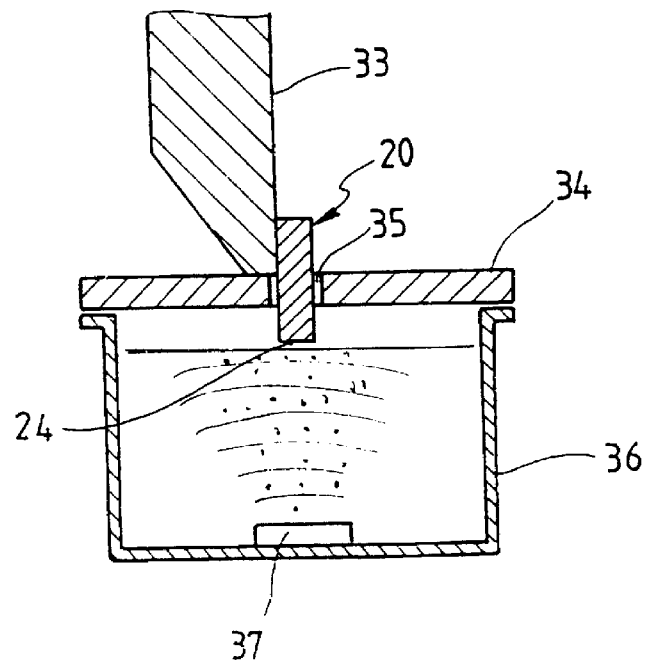
FIG. 10 is a diagram showing a method for washing the magnetic head.

In the washing and drying step, a chemical washing method is not suitable since there is a probability that the epoxy resin or UV bond of the core chip will be comprised. Thus, in the present invention, a water washing method is performed utilizing ultrasonic waves to increase washing efficiency. As shown in FIG. 10, chip core 20 attached to headbase 33 is stood upside down when inserted into a hole 35 of a support 34. That is, contact surface 24 of chip core 20 protrudes through hole 35 into a washing bath 36. Here, contact surface 24 of chip core 20 is located as close as possible to the water surface in washing bath 36, preferably that at a distance of 0.1–0.3 $\mu$m. An ultrasonic wave generator 37 is installed within washing bath 36. When ultrasonic wave generator 37 operates, air bubbles are generated, which floats to the water surface agitating it so that contact surface 24 of chip core 20 is washed. After completion of the washing step, chip core 20 is dried by a general hot air drying method and then polished by dry etching.

In the step for polishing which is the step prior to coating with a protection layer, a dry etching method is used. That is, contact surface 24 of chip core 20 is polished by collision at high speed with ions of large mass such as those from argon or nitride clipton.

Figure 11A:
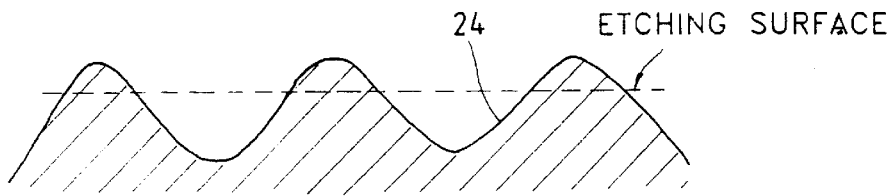
FIGS. 11A to 11C are cross-sections sequentially showing processes for forming a protection layer on the contact surface of the chip according to the present invention.
Figure 11B:
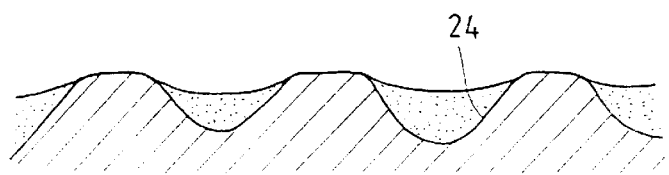
Figure 11C:
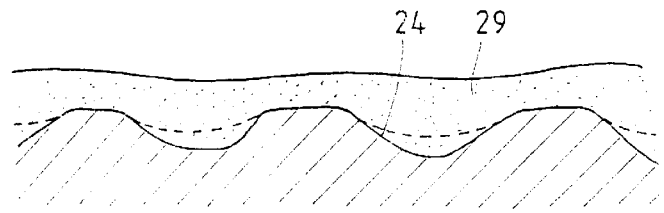

Protection layer 29 at a predetermined thickness is formed on contact surface 24 by the ECR method. The coating step may be composed of many sub-steps and the coating conditions may differ each time. For example, the protection layer may be coated multiply through first and second coating steps, by first using a sputtering method, a deposition layer as shown in FIG. 11A is coated. First, as shown in FIG. 11B, a part of contact surface 24 having valley shapes is coated through the first coating step. Then the whole surface of contact surface is coated with protection layer as shown in FIG. 11C.

As described above, methods for coating of the protection layer include a synthesizing method using RF plasma, a DC sputtering method, a high frequency or ion beam sputtering method or an ion deposition method, a plasma CVD method using hydrocarbon compound including hydrogen as a synthetic gas, and an ECR method. Experiments show that the ECR or PVD method is preferable. When the coating is performed, the temperature of the coating apparatus should be kept below 150° C. to avoid breaching the connection breaking temperature of the previously mentioned epoxy resin or UV bond.

Figure 12:
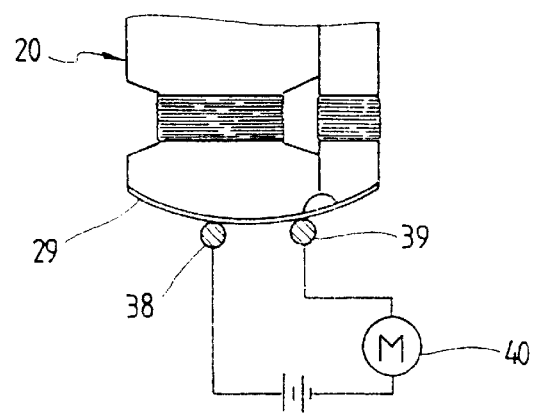
FIG. 12 is a diagram showing examination of the characteristics of the magnetic head according to the present invention.

An electric method is used to examine the quality of coated protection layer 29. As shown in FIG. 12, protection layer 29 of chip core 20 is placed on two parallel examination rods 38 and 39, in which a predetermined current flows, and the degree of conductivity is examined by a measuring instrument 40. That is, the examination applies the fact that the ferrite parent material of chip core 20 is a conductor while protection layer 29 is a non-conductor. The thickness of protection layer 29 as well as any partial coating defect are measured from the amount of current registered in measuring instrument 40, thereby enabling the elimination of any inferior coated protection layers. Active characteristics of the completed magnetic head are then measured to eliminate inferior ones.

In the step for pairing, pairs of magnetic head to be installed in one head drum are selected according to the characteristic obtained in the second step for examining active characteristic.

Hereinafter, the above-mentioned dry etching method using Ar ion will be described in detail.

Figure 13A:
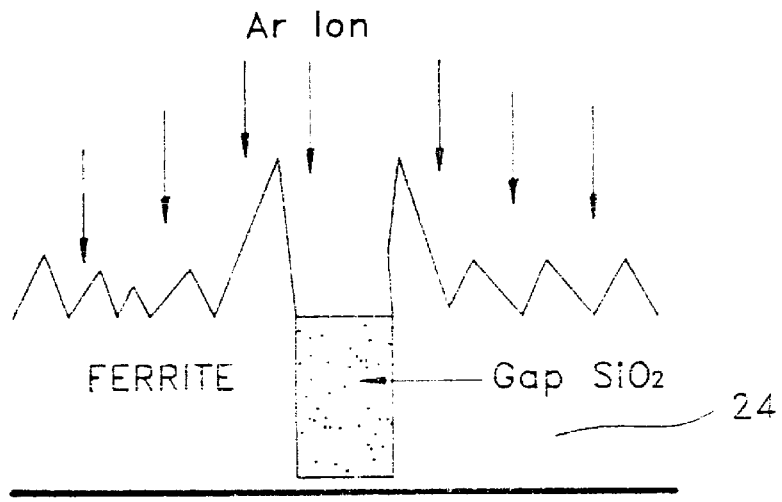
FIGS. 13A to 13C are diagrams sequentially showing a dry etching method for polishing the contact surface of the chip core according to the present invention.
Figure 13B:
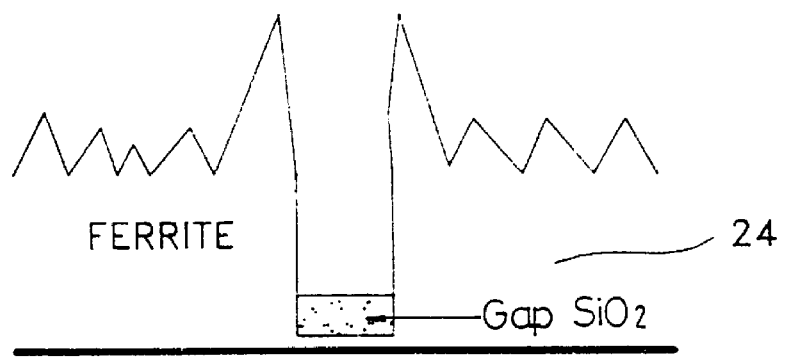
Figure 13C:
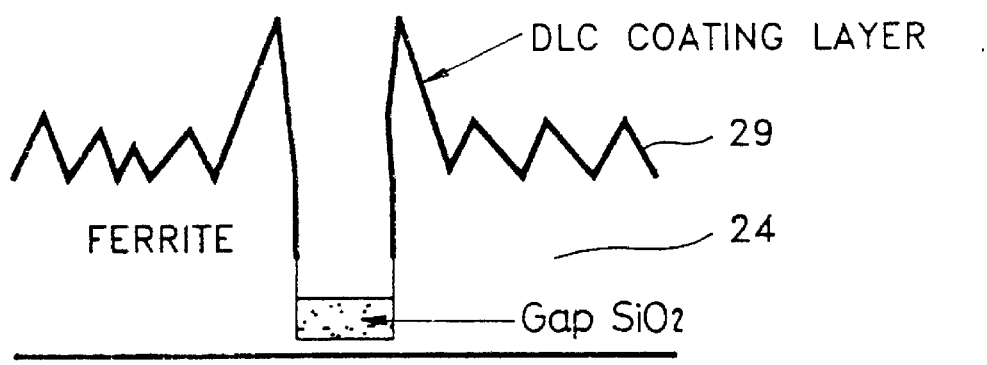

FIGS. 13A to 13C are diagrams sequentially showing a process for polishing the contact surface of the core members using the dry etching method and forming the protection layer. FIG. 13A shows Ar ions colliding with contact surface of the core members in a vertical direction with respect to the contact surface during the etching step. FIG. 13B shows the post polishing phase where prominences and depressions of the contact surface have become dulled due to etching step. FIG. 13C shows the completed step with the protection layer formed on the etched contact surface.

Figure 14A:
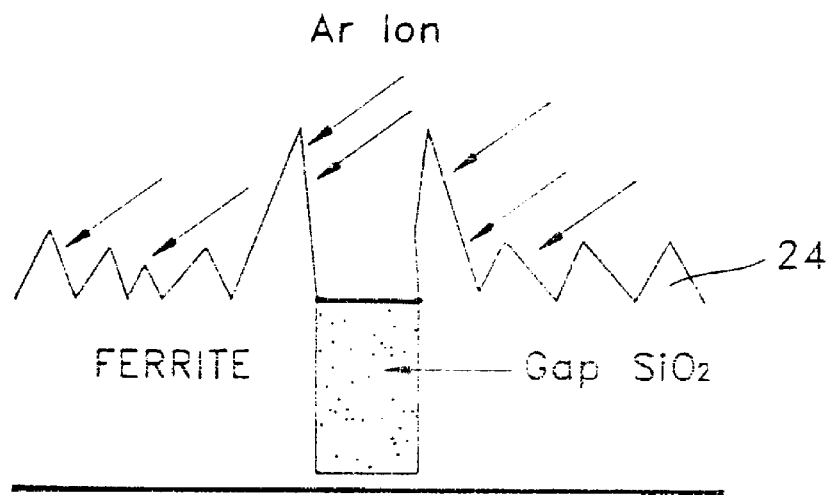
FIGS. 14A to 14C are diagrams showing a second dry etching method for polishing the contact surface of the chip core in another method according to the present invention.
Figure 14B:
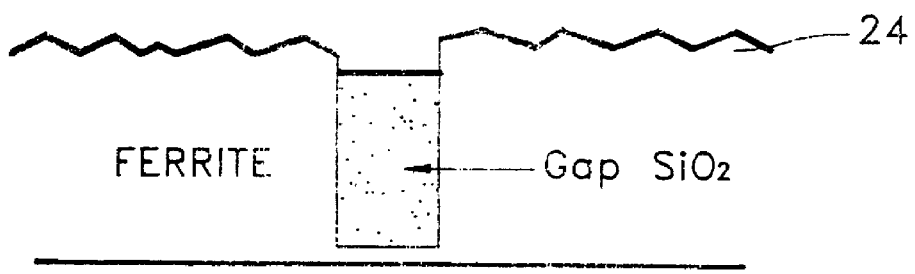
Figure 14C:
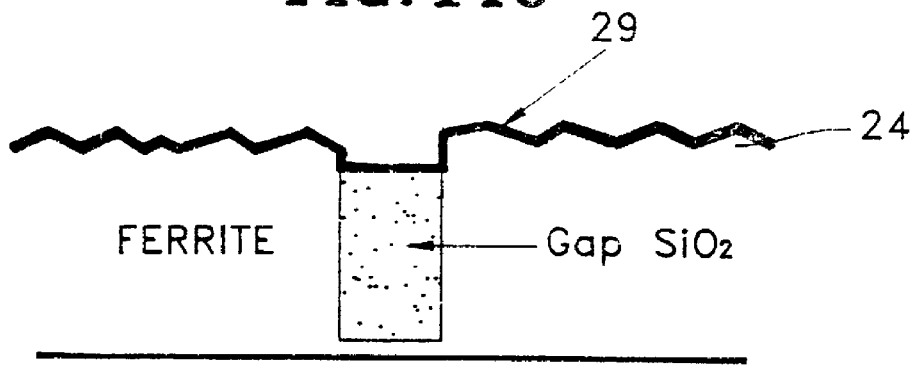

FIGS. 14A to 14C shows another preferred embodiment in the ion etching step. FIG. 14A shows Ar ions colliding with the contact surface of the chip core in a diagonal, direction, e.g., 70° or less, with respect to the contact surface during the etching step. FIG. 14B shows the post polishing phase where the prominences and depressions of the contact surface have become dulled by ion collision. FIG. 14C shows the completed step with the protection layer formed on the etched contact surface.

Comparing the above two preferred embodiments with each other, when Ar ions collide with the contact surface of the chip core in a diagonal direction with respect to the contact surface, a better result is obtained, than is the case where Ar ions collide with the contact surface of the chip core in a vertical direction.

Figure 15C:
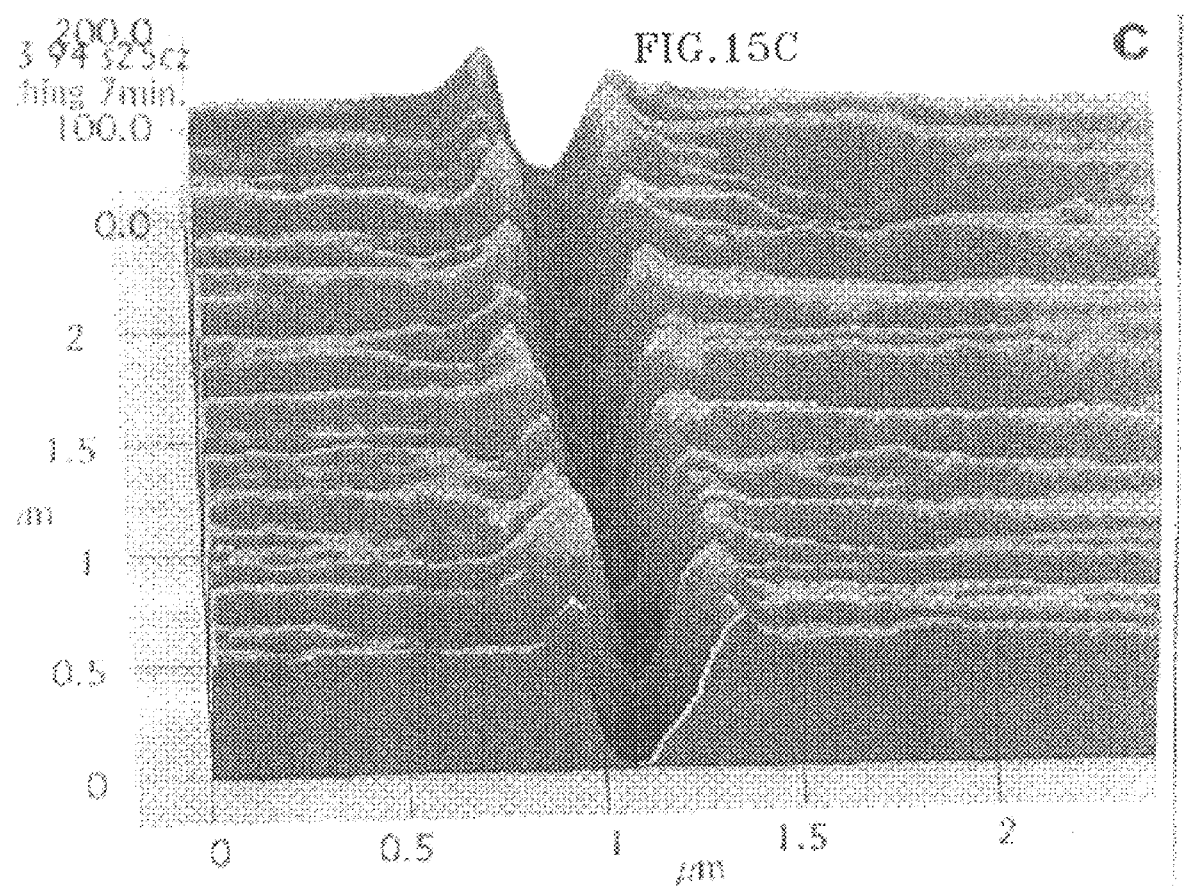

FIGS. 15A to 15D are results of electron micrographs, which show steps in the polishing process of the contact surface of the chip core using the dry etching method in a manufacturing method according to the present invention. Here, FIG. 15A shows the contact surface of the core members which has not been etched with Ar and FIGS. 15B to 15D show states where the prominences and depressions of the contact surface become dulled during the etching process with Ar.

To achieve the resultant etched contact surface of the core members shown in FIG. 14C, the conditions of Ar-dry etching process using ECR (Electron Cyclotron Resonance) method are: a gas pressure of 1.4 mTorr, a microwave output of 300W, and a substrate bias voltage of −100 V. Here, under the above etching conditions, the substrate bias voltage should be adjusted since the bias voltage is related to damage of the epoxy resin or UV bond used for attaching the chip core to the substrate.

Table 1 shows the degrees of damage to the epoxy resin according to the bias voltage and etching time, which were obtained through experiments.

TABLE 1

| Bias voltage (V) | Etching time (min) | Condition of epoxy resin |
|---|---|---|
| 20 | 40 | normal |
| 50 | 30 | normal |
| 100 | 10 | normal |
| 150 | 8 | change of surface color |
| 200 | 5 | slight damage |
| 300 | 3 | severe damage |

After the above-described etching step for the chip core with Ar ion, the protection layer such as DCT coating layer is formed on the contact surface of the chip core, using an ECR method. Here, the coating conditions are: voltage of 3 mTorr, microwave output of 50W and substrate bias voltage of −250 V.

Tables 2 to 4 are data obtained by comparing the present invention with DLC protection layer 29 coated at a thickness of 300–500 Å and the prior art without a protection layer, manufactured under the same conditions. Table 2 shows characteristics of the head, Table 3 shows the degree of abrasion the contact surface and Table 4 shows the degree of contamination.

TABLE 2

| Classification | | Coil capacity, | Frequency characteristic (present invention), $\mu V$ | | Frequency characteristic (prior art), $\mu V$ | |
|---|---|---|---|---|---|---|
| Channel | No. | $\mu H$ | 0.5 MHz | 5 MHz | 0.5 MHz | 5 MHz |
| CH-1 | 1 | 1.92 | 451 | 165 | 460 | 190 |
| | 2 | 1.93 | 484 | 203 | 460 | 190 |
| CH-2 | 1 | 1.96 | 599 | 257 | 540 | 230 |
| | 2 | 1.91 | 533 | 204 | 540 | 230 |
| Specification | | 1.9 ± 0.3 | 0.5 MHz→CH-1; 340 above CH-2; 130 above | | | |

TABLE 3

| Classi-fication | Time (min) | | | | | | | |
|---|---|---|---|---|---|---|---|---|
| | 0 | 5 | 10 | 15 | 20 | 25 | 30 | 60 |
| Prior art | 43.4 | 42.8 | 42.4 | 42.2 | 42.0 | 41.0 | 41.0 | 39.8 |
| Present invention | 48.4 | 48.4 | 48.2 | 48.2 | 48.0 | 48.0 | 47.6 | 44.6 |

TABLE 4

| No. of operation sets | Prior art No. of samples | | | Present invention No. of samples | | | | |
|---|---|---|---|---|---|---|---|---|
| | 1 | 2 | 3 | 1 | 2 | 3 | 4 | 5 |
| 1 | | ● | ● | | | | | |
| 2 | ● | | | | | | | |
| 3 | | | | | | | | |
| 4 | | | | | | | | |
| 5 | | | | | | | | |
| 6 | | | | | | ● | | |
| 7 | | | | | | | ● | |
| 8 above | | | | X | | | X | X |

In Table 2, the depth of the gap is not considered. From Table 2, it can be seen that DLC protection layer 29 according to the present invention does not affect the active characteristics of the head. In the abrasion test for obtaining Table 3, protruded head length measured over various time intervals is shown, which is obtained by rubbing the contact surface with a lapping tape (#20000) at five minute intervals. In the case of the present invention, about 15–20 minutes are required for the abrasion of DLC protection layer 29, and the abrasion of the chip core begins after DLC protection layer 29 is completely abraded. The results show that the present invention prolongs the life span of the contact surface by three to four times that of the prior art. Also, even though DLC protection layer 29 is partially removed, its life span thereof is prolonged, since the quality of head surface is much higher than that of the prior art. The abrasion of DLC protection layer 29 starts after the protruding portion of contact surface of chip core is exposed due to the difficulty in abrading DLC protection layer 29, compared with the core. As a result, a high degree of levelness and broadness of the surface thereof is maintained until DLC protection layer 29 is completely abraded.

In a contamination test of Table 4, a recording mode of ten minutes and a still mode of five minutes, which correspond to one operation set performed in a video deck, are performed by using a special tape which generates foreign material easily, to count the number of operation sets performed until the first foreign material is generated on the contact surface. In the case of the prior art, foreign material is generated after one or two operations in all three samples, to thereby contaminate the head. However, according to the present invention, the foreign material is generated after six to seven operations in two samples and in after seven operations in three samples. Thus, contamination of the head does not occur so readily.

Figure 16A:
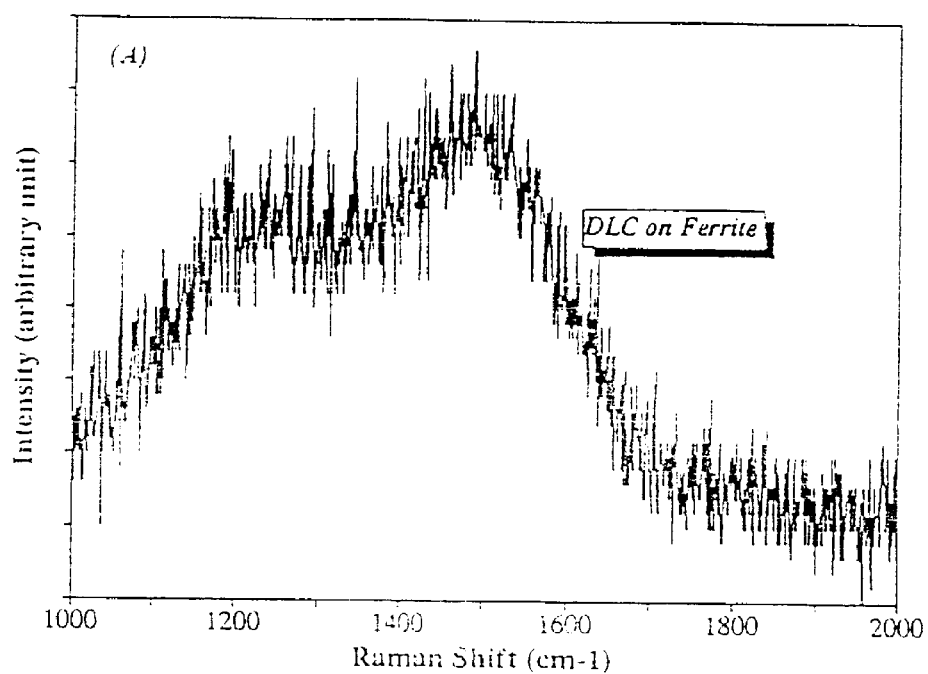
FIGS. 16A and 16B are graphs showing the protection layer and the silicon oxide portion of the gap analyzed using a micro-Raman system.
Figure 16B:
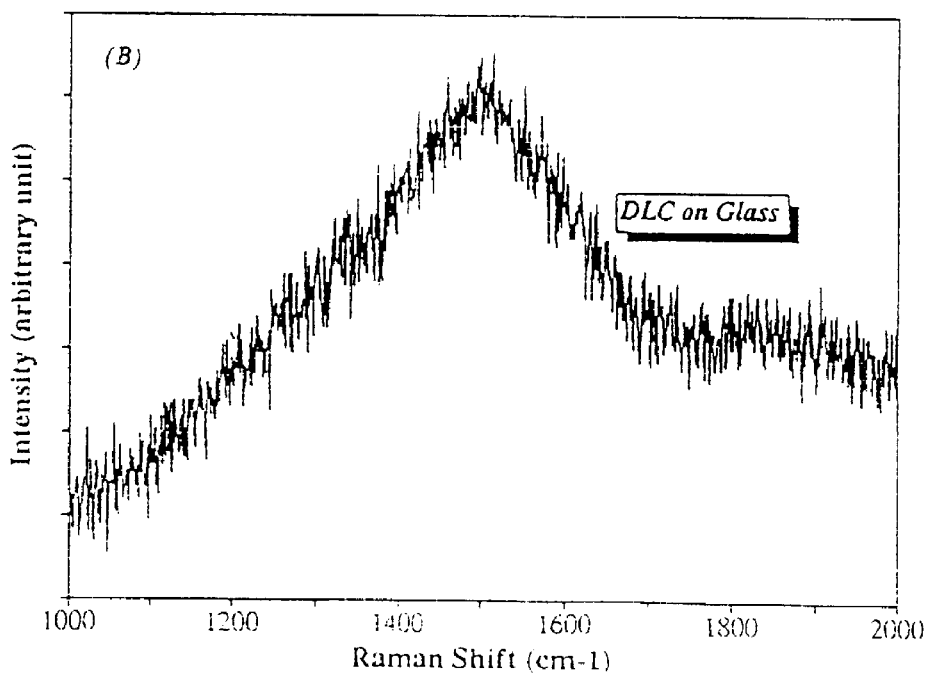

FIGS. 16A and 16B are diagrams showing the protection layer and the silicon oxide portion of the gap analyzed by using a micro-Raman system. Generally, when DLC is analyzed by "micro-Raman system", a broad peak is shown near 1500 cm$^{-1}$ or 1300 cm$^{-1}$. As shown in FIGS. 16A and 16B, a broad peak is shown near 1500 cm$^{-1}$. Therefore, it is shown that typically DLC protection layer 29 is formed all over the contact surface of core members of the chip core and the gap therebetween filled with silicon oxide.

FIG. 17 is a graph of lap time versus abraded amount showing the anti-abrasion property of a magnetic head having a DLC protection layer and conventional one.

As described above, according to the present invention, first, the cross-sectional area of the gap can be narrowed to an optimum level with regard to the magnetic characteristics, so that the density of the leakage of magnetic flux during recording and the output during reproducing are increased. Due to the constant cross-sectional area of gap and the high lubricating property of the surface, recording and reproducing characteristics of the magnetic head are remarkably improved. The problem of frictional noise is solved as a result thereof. Also, according to the present invention, the height differences among the core members adjacent to the gap, silicon oxide and glass, caused from the differing amounts of abrasion, are reduced, so that the head is subject to less contamination.

According to the present invention, the adhesive force of the reinforced glass connecting two core members is also improved and the surface intensity of the contact surface of the core members is increased to thereby provide good anti-impulse properties. Also, the thickness of the core members can be reduced to an optimum level according to the reduction of the depth of gap, so that the present invention can be applied to the magnetic head of a mini-head drum which is adopted in an 8 mm video tape recorder, a camcorder, and a digital audio tape recorder.

The present invention can be applied to other types of magnetic heads, i.e., all connection type magnetic heads including the floating magnetic head used in a hard disk drive as well as the magnetic head installed in a rotary head drum. Also, any material having good anti-abrasion properties and surface lubrication properties other than DLC may be used as the above-described protection layer.

The above described embodiments of the invention are illustrative and not restrictive of the invention. The scope of the claimed invention is to be measured by the claims appended hereto.

What is claimed is:

1. A method for manufacturing a magnetic head comprising the steps of:
   preparing a chip core having a curved contact surface for contacting a magnetic tape, said curved contact surface having a gap for forming a leakage magnetic field; and
   forming a protection layer on said curved contact surface, which is made of an amorphous diamond-like carbon (DLC) material selected from the group consisting of: YSZ, W, CN $Si_3N_4$, $MoS_2$. TiC and TiN having high surface lubricating properties and good anti-abrasion properties.

2. A method for manufacturing a magnetic head as claimed in claim 1, wherein said contact surface of said chip core has undulations and wherein said step of forming a protection layer comprises a first coating step where undulations formed in said contact surface are coated with a first layer of protective coating material and then a second coating step where said contact surface is coated with a second layer of protective coating material after the first coating step.

3. A method for manufacturing a magnetic head as claimed in claim 2, wherein the thickness of said protection layer is 50 Å–10 μm.

4. A method for manufacturing a magnetic head as claimed in claim 2, wherein the thickness of said protection layer is 100 Å–500 Å.

5. A method for manufacturing a magnetic head as claimed in claim 1, wherein the thickness of said protection layer is 50 Å–10 μm.

6. A method for manufacturing a magnetic head as claimed in claim 1, wherein the thickness of said protection layer is 100 Å–500 Å.

7. A method for manufacturing a magnetic head, comprising the steps of:
preparing a chip core having a curved contact surface for contacting a magnetic tape, said curved contact surface having a gap for forming a leakage magnetic field;
washing and drying said curved contact surface, wherein in said step of washing and drying, said contact surface of said chip core is washed using air bubbles generated by an ultrasonic wave generator while being located close to the water surface in a washing bath; and
forming a protection layer on said washed and dried contact surface, which is made of material having high surface lubricating properties and good anti-abrasion properties.

8. A method for manufacturing a magnetic head as claimed in claim 7, wherein said contact surface of said chip core has undulations and wherein said step of forming a protection layer comprises a first coating step where undulations formed in said contact surface are coated with a first layer of protective coating material and a second coating step where said contact surface is coated with a second layer of protective coating material after the first coating step.

9. A method for manufacturing a magnetic head as claimed in claim 8, wherein the thickness of said protection layer is 50 Å–10 μm.

10. A method for manufacturing a magnetic head as claimed in claim 8, wherein the thickness of said protection layer is 100 Å–500 Å.

11. A method for manufacturing a magnetic head as claimed in claim 4, wherein said protection layer an amorphous diamond-like carbon (DLC) material selected from the group consisting of: YSZ, W, CN, $Si_3N_4$, $MOS_2$, TiC and TiN.

12. A method for manufacturing a magnetic head as claimed in claim 1, wherein the thickness of said protection layer is 50 Å–10 μm.

13. A method for manufacturing a magnetic head as claimed in claim 11, wherein the thickness of said protection layer is 100 Å–500 Å.

14. A method for manufacturing a magnetic head as claimed in claim 7, wherein said protection layer is composed of an amorphous diamond-like carbon material selected from the group consisting of: (DLC), YSZ, W, CN, $Si_3N_4$, $MoS_2$, TiC and TiN.

15. A method for manufacturing a magnetic head as claimed in claim 14, wherein the thickness of said protection layer is 50 Å–10 μm.

16. A method for manufacturing a magnetic head as claimed in claim 14, wherein the thickness of said protection layer is 100 Å–500 Å.

17. A method for manufacturing a magnetic head as claimed in claim 7, wherein the thickness of said protection layer is 50 Å–10 μm.

18. A method for manufacturing a magnetic head as claimed in claim 7, wherein the thickness of said protection layer is 100 Å–500 Å.

19. A method for manufacturing a magnetic head comprising the steps of:
preparing a chip core having a curved contact surface for contacting a magnetic tape, said curved contact surface having a gap for forming a leakage magnetic field;
polishing said curved contact surface of said chip core by using an ion etching method where the contact surface is bombarded with ions; and
forming a protection layer on said polished contact surface, which is made of a material having high surface lubrication properties and good anti-abrasion properties.

20. A method for manufacturing a magnetic head as claimed in claim 19, further comprising the step of washing and drying said contact surface between said steps of preparing said chip core and forming said protection layer, wherein in said step of washing and drying, said contact surface of said chip core is washed using air bubbles generated by an ultrasonic wave generator while being located close to the water surface in a washing bath.

21. A method for manufacturing a magnetic head as claimed in claim 20, wherein in said polishing step, said ions collide with said contact surface of said chip core in a diagonal direction of 70° or less with respect to said contact surface.

22. A method for manufacturing a magnetic head as claimed in claim 21, wherein the thickness of said protection layer is 100 Å–500 Å.

23. A method for manufacturing a magnetic head as claimed in claim 21, wherein in said polishing step, bias voltage applied to a substrate of an ion etching device used for said ion etching process is within the range of –20 V to –250 V.

24. A method for manufacturing a magnetic head as claimed in claim 23, wherein the thickness of said protection layer is 100 Å–500 Å.

25. A method for manufacturing a magnetic head as claimed in claim 20, wherein said protection layer is composed of a material selected from the group consisting of amorphous diamond like carbon (DLC), YSZ, W, CN, $Si_3N_4$, $MoS_2$, TiC and TiN.

26. A method for manufacturing a magnetic head as claimed in claim 25, wherein the thickness of said protection layer is 100 Å–500 Å.

27. A method for manufacturing a magnetic head as claimed in claim 25, wherein said protection layer is made of diamond like carbon (DLC) using an Electron Cyclotron Resonance (ECR) method.

28. A method for manufacturing a magnetic head as claimed in claim 27, wherein said diamond like carbon (DLC) is deposited at a temperature below 150° C.

29. A method for manufacturing a magnetic head as claimed in claim 27, wherein the conditions of Ar-dry etching process using said ECR method are a gas pressure of 1.4 mTorr, a microwave output of 300W, and a substrate bias voltage of –100 V.

30. A method for manufacturing a magnetic head as claimed in claim 29, wherein said diamond like carbon (DLC) is deposited at a temperature below 150° C.

31. A method for manufacturing a magnetic head as claimed in claim 20, wherein the thickness of said protection layer is 50 Å–10 μm.

32. A method for manufacturing a magnetic head as claimed in claim 31, wherein the thickness of said protection layer is 100 Å–500 Å.

33. A method for manufacturing a magnetic head as claimed in claim 20, further comprising the step of examining the coating quality of the protection layer after said step of forming a protection surface.

34. A method for manufacturing a magnetic head as claimed in claim 33, wherein in said step of examining the coating quality, resistance of the protection layer formed on said contact surface of said chip core is measured.

35. A method for manufacturing a magnetic head as claimed in claim 20, wherein in said polishing step, said ions bombard said contact surface of said chip core in a diagonal direction at 70°.

36. A method for manufacturing a magnetic head as claimed in claim 19, wherein said contact surface of said chip core has undulations and wherein said step of forming a protection layer comprises a first coating step where undulations formed in said contact surface are coated with a first layer of protective coating material and then a second coating step where the whole surface of said contact surface is coated with a second layer of protective coating material after the first coating step.

37. A method for manufacturing a magnetic head as claimed in claim 30, wherein in said polishing step, said ions collide with said contact surface of said chip core in a diagonal direction of 70° or less with respect to said contact surface.

38. A method for manufacturing a magnetic head as claimed in claim 37, wherein the thickness of said protection layer is 100 Å–500 Å.

39. A method for manufacturing a magnetic head as claimed in claim 37, wherein in said polishing step, bias voltage applied to a substrate of an ion etching device used for said ion etching process is within the range of −20 V to −250 V.

40. A method for manufacturing a magnetic head as claimed in claim 39, wherein the thickness of said protection layer is 100 Å–500 Å.

41. A method for manufacturing a magnetic head as claimed in claim 36, wherein said protection layer is composed of a material selected from the group consisting of amorphous diamond like carbon (DLC), YSZ, W, CN, $Si_3N_4$, $MoS_2$, TiC and TiN.

42. A method for manufacturing a magnetic head as claimed in claim 41, wherein the thickness of said protection layer is 100 Å–500 Å.

43. A method for manufacturing a magnetic head as claimed in claim 36, wherein the thickness of said protection layer is 50 Å–10 μm.

44. A method for manufacturing a magnetic head as claimed in claim 43, wherein the thickness of said protection layer is 100 Å–500 Å.

45. A method for manufacturing a magnetic head as claimed in claim 19, wherein in said polishing step, said ions collide with said contact surface of said chip core in a diagonal direction of 70° or less with respect to said contact surface.

46. A method for manufacturing a magnetic head as claimed in claim 45, wherein the thickness of said protection layer is 100 Å–500 Å.

47. A method for manufacturing a magnetic head as claimed in claim 45, wherein in said polishing step, bias voltage applied to a substrate of an ion etching device used for said ion etching process is within the range of −20 V to −250 V.

48. A method for manufacturing a magnetic head as claimed in claim 47, wherein the thickness of said protection layer is 100 Å–500 Å.

49. A method for manufacturing a magnetic head as claimed in claim 19, wherein said protection layer is composed of a material selected from the group consisting of amorphous diamond like carbon (DLC), YSZ, W, CN, $Si_3N_4$, $MoS_2$, TiC and TiN.

50. A method for manufacturing a magnetic head as claimed in claim 49, wherein the thickness of said protection layer is 100 Å–500 Å.

51. A method for manufacturing a magnetic head as claimed in claim 49, wherein said protection layer is made of diamond like carbon (DLC) using an Electron Cyclotron Resonance (ECR) method.

52. A method for manufacturing a magnetic head as claimed in claim 51, wherein said diamond like carbon (DLC) is deposited at a temperature below 150° C.

53. A method for manufacturing a magnetic head as claimed in claim 51, wherein the conditions of Ar-dry etching process using said ECR method are a gas pressure of 3 mTorr, a microwave output of 50W, and a substrate bias voltage of 250 V.

54. A method for manufacturing a magnetic head as claimed in claim 53, wherein said diamond like carbon (DLC) is deposited at a temperature below 150° C.

55. A method for manufacturing a magnetic head as claimed in claim 19, wherein the thickness of said protection layer is 50 Å–10 μm.

56. A method for manufacturing a magnetic head as claimed in claim 55, wherein the thickness of said protection layer is 100 Å–500 Å.

* * * * *